United States Patent
Liao et al.

(10) Patent No.: US 7,785,156 B1
(45) Date of Patent: Aug. 31, 2010

(54) ELECTRICAL CONNECTOR FOR A DYNAMO HUB

(76) Inventors: Kuei-Tang Liao, No. 148, Cingcyuan Road, Daya Township, Taichung County (TW); Hubert Chen, No. 269, Sec. 3, Minsheng Road, Daya Township, Taichung County (TW)

( * ) Notice: Subject to any disclaimer, the term of this patent is extended or adjusted under 35 U.S.C. 154(b) by 0 days.

(21) Appl. No.: 12/507,246

(22) Filed: Jul. 22, 2009

(30) Foreign Application Priority Data

Mar. 10, 2009   (TW) ............................... 98107650 A

(51) Int. Cl.
   *H01R 13/405* (2006.01)
(52) U.S. Cl. ...................................... 439/736
(58) Field of Classification Search ................. 439/736, 439/606, 695, 936, 276, 347, 218
   See application file for complete search history.

(56) References Cited

U.S. PATENT DOCUMENTS

| | | | | |
|---|---|---|---|---|
| 2,007,008 A | * | 7/1935 | Staples ....................... | 420/477 |
| 4,790,776 A | * | 12/1988 | Iijima ......................... | 439/695 |
| 6,505,402 B2 | * | 1/2003 | Moriwake et al. ............. | 29/883 |
| 6,729,889 B2 | * | 5/2004 | Bauer .......................... | 439/67 |
| 6,957,981 B2 | * | 10/2005 | Karino et al. ............... | 439/606 |

* cited by examiner

*Primary Examiner*—Jean F Duverne
(74) *Attorney, Agent, or Firm*—Fish & Richardson P.C.

(57) ABSTRACT

An electrical connector for a dynamo hub includes a fastening component, a hollow insulating component formed with first and second accommodating spaces and a passage, and an electrode unit including at least one electrode plate that has a welding section disposed in the second accommodating space. The fastening component includes a metallic surrounding wall adapted to be sleeved on a hub axle of the dynamo hub, and having an inner surface formed with a positioning protrusion to be inserted into a groove in the hub axle, and a radial through hole extending from the inner surface to the outer surface and to be radially aligned with the groove in the hub axle. The first accommodating space retains the fastening component therein, and the passage is in spatial communication with the first and second accommodating spaces and is radially aligned with the radial through hole.

8 Claims, 4 Drawing Sheets

US 7,785,156 B1

ELECTRICAL CONNECTOR FOR A DYNAMO HUB

CROSS-REFERENCE TO RELATED APPLICATION

This application claims priority of Taiwanese Application No. 098107650, filed on Mar. 10, 2009.

BACKGROUND OF THE INVENTION

1. Field of the Invention

The present invention relates to an electrical connector, more particularly to an electrical connector for a dynamo hub.

2. Description of the Related Art

A bicycle is usually provided with a dynamo hub for generating electricity, and the dynamo hub is coupled to an electrical load via an electrical connector. The electrical connector as disclosed in U.S. Pat. No. 7,048,546 and U.S. Pat. No. 6,559,564 are mounted on a hub axle via an insulating component usually made of a plastic material. Therefore, the structure of the insulating component is relatively weak to resist an external force, and it is difficult to retain the insulating component firmly. Moreover, the insulating component is constructed from various parts such that molding cost is increased and an assembly procedure of the insulating component is time-consuming.

SUMMARY OF THE INVENTION

Therefore, an object of the present invention is to provide an electrical connector for a dynamo hub, the structure of which is relatively durable, and which has a relatively fewer number of components.

Accordingly, an electrical connector of this invention is adapted for a dynamo hub. The dynamo hub includes a hub axle formed with a groove extending along an axial direction, a stator unit retained on the hub axle and having a conducting wire unit that extends in the groove of the hub axle, and a rotor unit. The electrical connector comprises:

a fastening component including a metallic surrounding wall adapted to be sleeved on the hub axle, and having an inner surface that is formed with a positioning protrusion to be inserted into the groove in the hub axle, an outer surface, and a radial through hole extending from the inner surface to the outer surface and to be radially aligned with the groove in the hub axle;

a hollow insulating component formed with a first accommodating space for retaining the fastening component therein, a second accommodating space, and a passage that is in spatial communication with the first and second accommodating spaces and that is radially aligned with the radial through hole; and an electrode unit including at least one electrode plate having a welding section disposed in the second accommodating space.

The conducting wire unit of the stator unit of the dynamo hub is extendible in sequence through the radial through hole in the fastening component and the passage in the hollow insulating component to reach the second accommodating space for welding to the welding section of the at least one electrode plate of the electrode unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
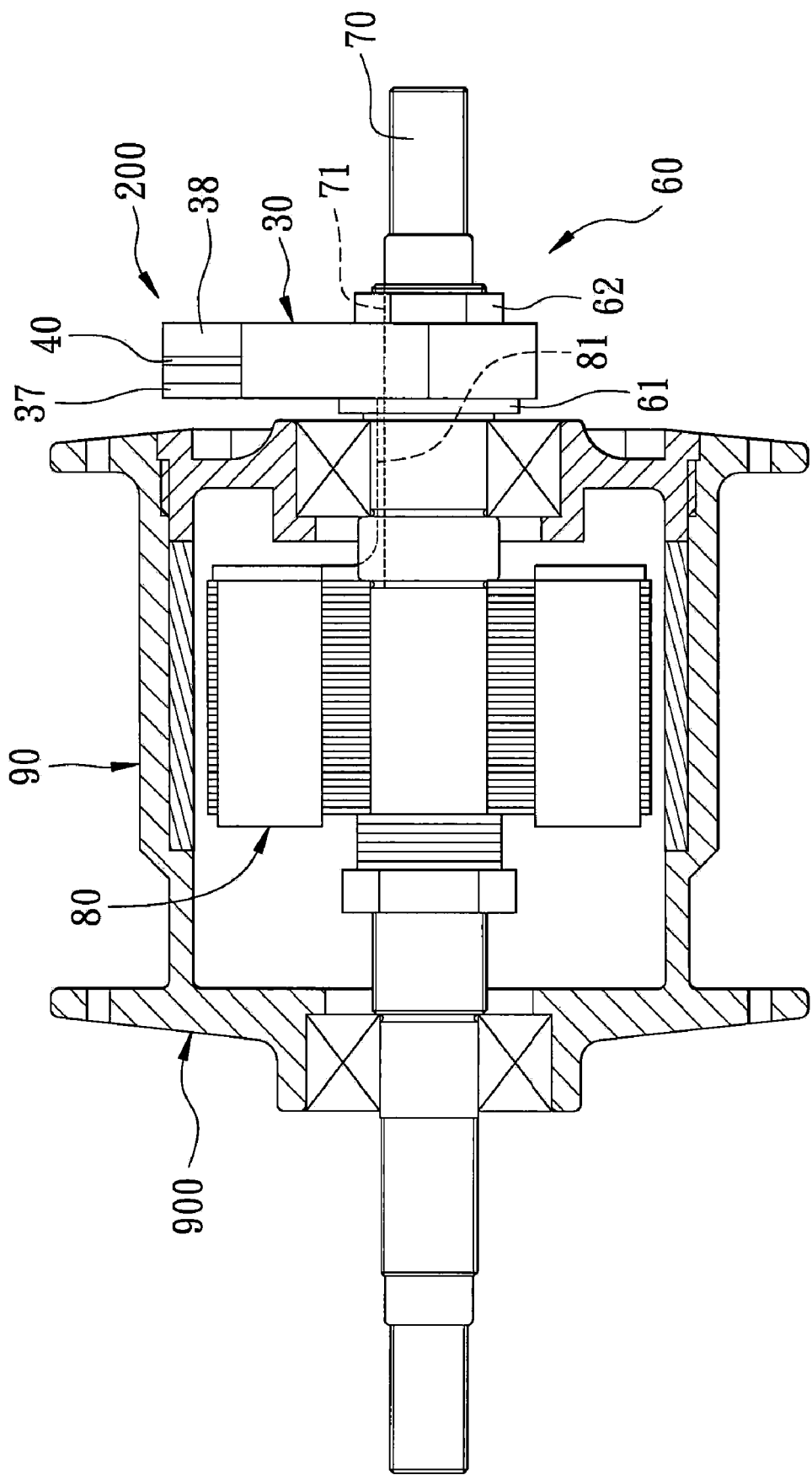
FIG. 1 is a schematic diagram illustrating a preferred embodiment of an electrical connector for a dynamo hub of this invention.
Figure 2:
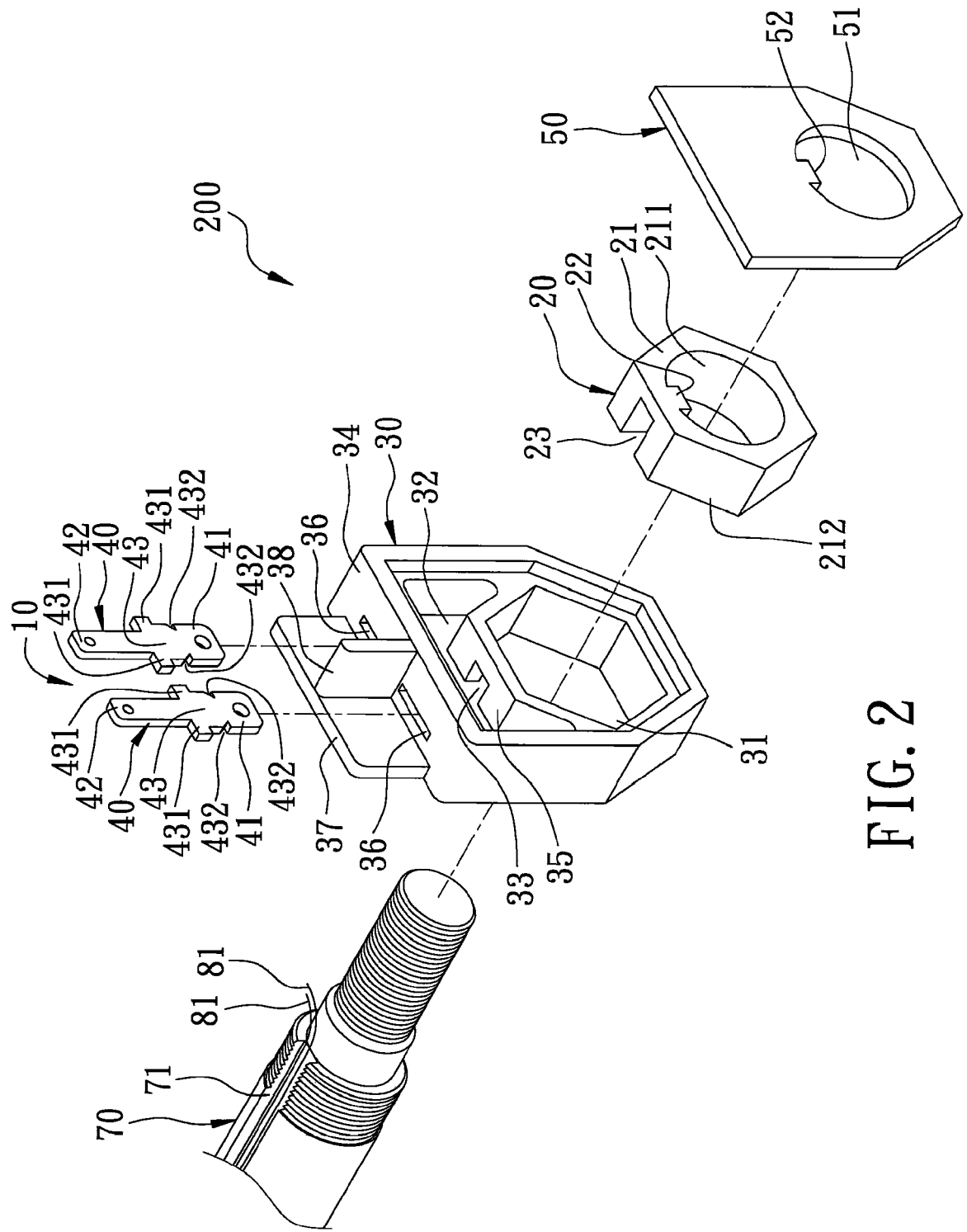
FIG. 2 is an exploded perspective view of the electrical connector.

Referring to FIGS. 1 and 2, a preferred embodiment of an electrical connector 200 according to this invention is used with a conventional dynamo hub 900. The dynamo hub 900 includes a hub axle 70 that is formed with a groove 71 extending along an axial direction, a stator unit 80 that is retained on the hub axle 70 and that has a pair of conducting wires 81 extending in the groove 71 of the hub axle 70, and a rotor unit 90. The electrical connector 200 includes a fastening component 20, a hollow insulating component 30, an electrode unit 10, a closure plate 50, and a retaining unit 60. In this embodiment, the electrode unit 10 includes a pair of electrode plates 40.

Figure 3:
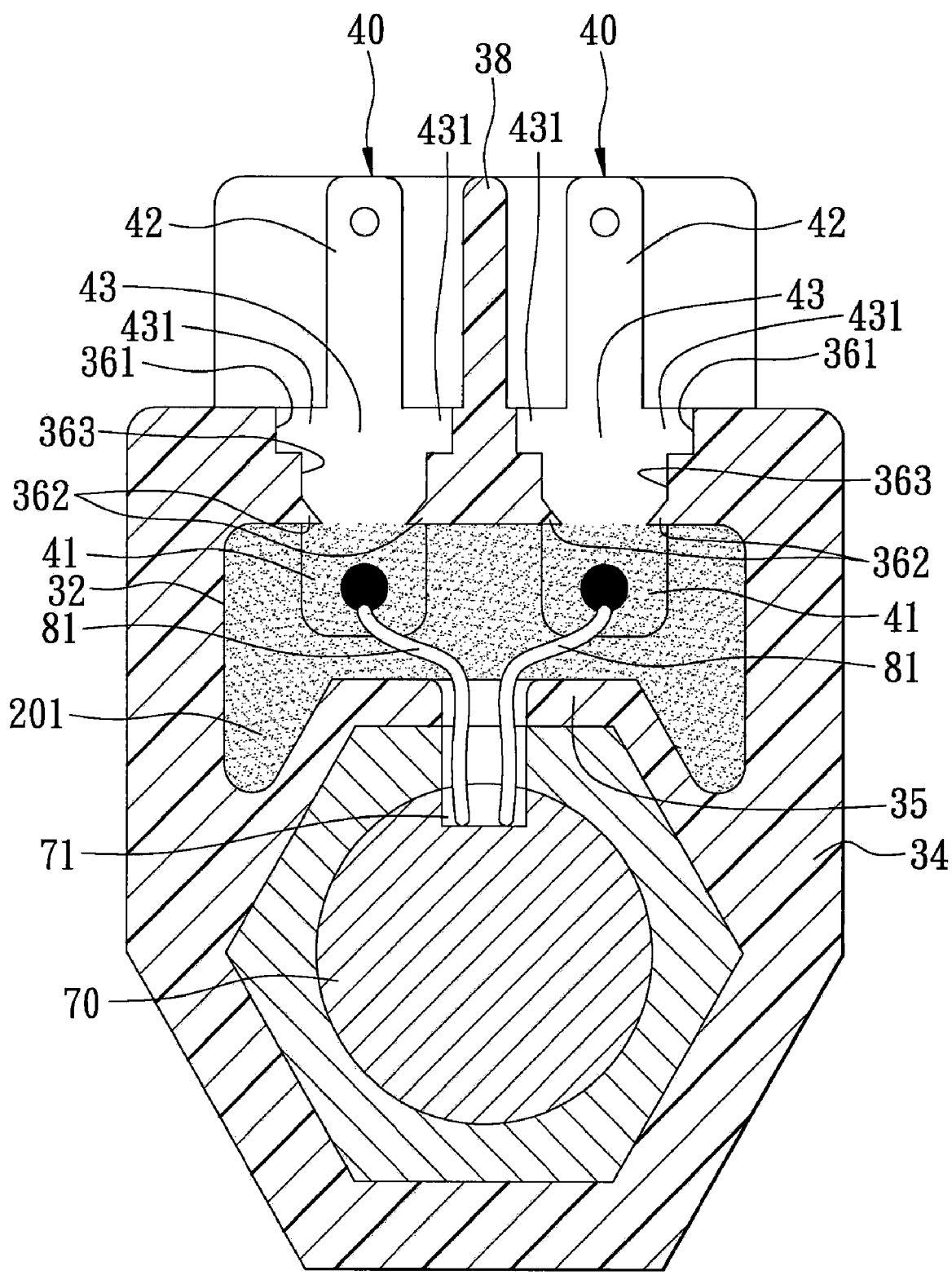
FIG. 3 is a cross-sectional view of the electrical connector.

Further referring to FIG. 3, the fastening component 20 includes a metallic surrounding wall 21 adapted to be sleeved on the hub axle 70. The metallic surrounding wall 21 has an inner surface 211 formed with a positioning protrusion 22 to be inserted into the groove 71 in the hub axle 70, an outer surface 212, and a radial through hole 23 extending from the inner surface 211 to the outer surface 212 and to be radially aligned with the groove 71 in the hub axle 70. The outer surface 212 of the metallic surrounding wall 21 is a non-circular surface. The radial through hole 23 and the positioning protrusion 22 are aligned in the axial direction.

The hollow insulating component 30 is an integrally formed piece, and includes a surrounding wall 34 formed with a slot unit, a partition wall 35, a guiding wall 37, and a barrier 38. The partition wall 35 is connected to and cooperates with the surrounding wall 34 to define a first accommodating space 31 for retaining the fastening component 20 therein, and a second accommodating space 32. In this embodiment, the outer surface 212 of the metallic surrounding wall 21 is a hexagonal surface retained non-rotatably by the hollow insulating component 30 in the first accommodating space 31. The partition wall 35 is formed with a passage 33 that is in spatial communication with the first and second accommodating spaces 31, 32, and that is radially aligned with the radial through hole 23. The guiding wall 37 is connected to the surrounding wall 34 and extends parallel to the electrode plates 40. The barrier 38 projects from the guiding wall 37 and is disposed between the electrode plates 40.

In this embodiment, the slot unit in the surrounding wall 34 includes a pair of electrode slots 36 in spatial communication with the second accommodating space 32. Each of the electrode slots 36 has a wider slot segment 361 and a narrower slot segment 363 respectively disposed distal from and proximate to the second accommodating space 32. The narrower slot segment 363 is narrower than the wider slot segment 361, and is defined by a slot surface formed with an opposing pair of triangular electrode positioning parts 362.

The electrode unit 10 is disposed at the hollow insulating component 30. Each of the electrode plates 40 of the electrode unit 10 has a welding section 41 disposed in the second accommodating space 32, a coupling section 42 disposed outwardly of the hollow insulating component 30, and a retaining section 43 interconnecting the welding section 41 and the coupling section 42 and being disposed in a corresponding one of the electrode slots 36. The retaining section 43 has a pair of opposite projecting parts 431 projecting from two opposite sides thereof and being disposed in the wider slot segment 361 of the corresponding one of the electrode slots 36 for positioning the electrode plate 40. The retaining section 43 has a pair of notches 432 at a junction with the welding section 41 for respectively engaging the electrode positioning parts 362 to prevent removal of the electrode plate 40.

During assembly, the conducting wires 81 of the stator unit 80 of the dynamo hub 900 extend in sequence through the radial through hole 23 in the fastening component 20 and the passage 33 in the hollow insulating component 30 to reach the second accommodating space 32 for welding to the welding sections 41 of the electrode plates 40, respectively. An insulating encapsulant 201 fills the second accommodating space 32 and covers the welding sections 41 after welding to strengthen connection between the conducting wires 81 and the welding sections 41, and to avoid rust and a short circuit of the welding sections 41.

Figure 4:
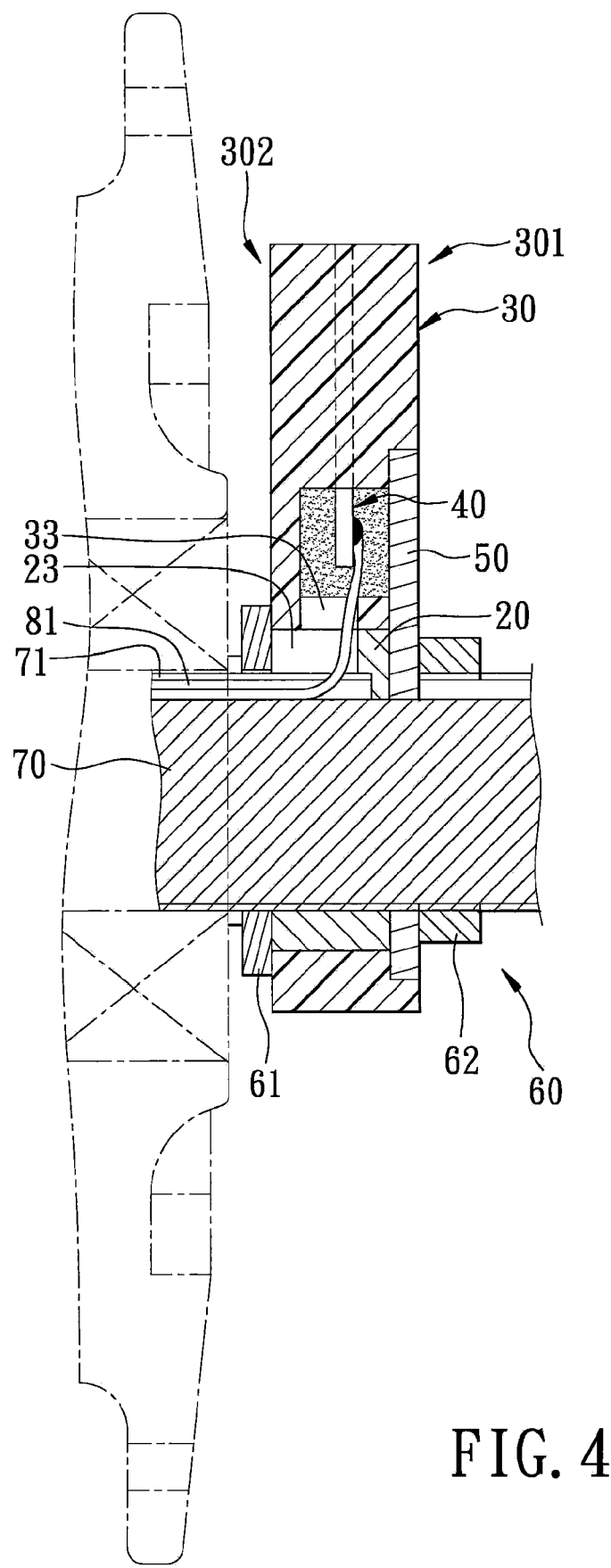
FIG. 4 is a cross-sectional side view of the electrical connector.

The closure plate 50 is made of metal for strengthening the overall structure of the electrical connector 200, and is formed with an opening 51 for extension of the hub axle 70 therethrough, and protrusion part 52 disposed in the opening 51 and to be inserted into the groove 71 in the hub axle 70. Referring to FIGS. 2 and 4, the hollow insulating component 30 has a first axial open side 301 opposite to the dynamo hub 900, and a second axial open side 302 opposite to the first axial open side 301 and adjacent to the dynamo hub 900. In this embodiment, an inner surface of the surrounding wall 34 is stepped, and defines a recess adjacent to the first axial open side 301. The closure plate 50 is embedded in the recess in the hollow insulating component 30 for closing the first axial open side 301.

Referring to FIGS. 1 and 4, the retaining unit 60 includes a washer 61 and a screw nut 62. The washer 61 is used for closing and abutting against the second axial open side 302 of the insulating component 30. The screw nut 62 is used for abutting against the closure plate 50.

In sum, by virtue of the metallic surrounding wall of the fastening component 20, the electrical connector 200 of this invention is more durable than the conventional electrical connector. Moreover, the hollow insulating component 30 is an integrally formed piece to thereby lessen a number of components of the electrical connector 200 and reduce manufacturing cost of the electrical connector 200.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An electrical connector for a dynamo hub, the dynamo hub including a hub axle that is formed with a groove extending along an axial direction, a stator unit that is retained on the hub axle and that has a conducting wire unit extending in the groove of the hub axle, and a rotor unit, said electrical connector comprising:
   a fastening component including a metallic surrounding wall adapted to be sleeved on the hub axle, and having an inner surface that is formed with a positioning protrusion to be inserted into the groove in the hub axle, an outer surface that is a non-circular surface, and a radial through hole extending from said inner surface to said outer surface and to be radially aligned with the groove in the hub axle, said radial through hole and said positioning protrusion being aligned in the axial direction;
   a hollow insulating component formed with a first accommodating space for non-rotatably retaining said fastening component therein, a second accommodating space, and a passage that is in spatial communication with said first and second accommodating spaces and that is radially aligned with said radial through hole; and
   an electrode unit including at least one electrode plate having a welding section disposed in said second accommodating space;
   whereby, the conducting wire unit of the stator unit of the dynamo hub is extendible in sequence through said radial through hole in said fastening component and said passage in said hollow insulating component to reach said second accommodating space for welding to said welding section of said at least one electrode plate of said electrode unit.

2. The electrical connector as claimed in claim 1, wherein said hollow insulating component includes a surrounding wall and a partition wall connected to and cooperating with said surrounding wall to define said first and second accommodating spaces, said partition wall being formed with said passage.

3. The electrical connector as claimed in claim 2, wherein said hollow insulating component has an axial open side, and said electrical connector further comprises a closure plate for closing said axial open side of said hollow insulating component.

4. The electrical connector as claimed in claim 3, wherein said closure plate is made of metal and is formed with an opening for extension of the hub axle therethrough, and a protrusion part disposed in said opening and to be inserted into the groove in the hub axle.

5. The electrical connector as claimed in claim 2, wherein:
   said surrounding wall of said hollow insulating component is formed with a slot unit including at least one electrode slot that is in spatial communication with said second accommodating space;
   said electrode slot having a wider slot segment and a narrower slot segment respectively disposed distal from and proximate to said second accommodating space, said narrower slot segment being narrower than said wider slot segment and being defined by a slot surface formed with an opposing pair of electrode positioning parts;
   said at least one electrode plate of said electrode unit further having a coupling section disposed outwardly of said hollow insulating component, and a retaining section interconnecting said welding section and said coupling section and disposed in said electrode slot;
   said retaining section having a pair of notches at a junction with said welding section for engaging said electrode positioning parts, respectively.

6. The electrical connector as claimed in claim 5, wherein said electrode unit includes two of said electrode plates, and said hollow insulating component further includes a guiding wall connected to said surrounding wall and extending parallel to said electrode plates, and a barrier projecting from said guiding wall and being disposed between said electrode plates.

7. The electrical connector as claimed in claim 6, wherein said hollow insulating component is an integrally formed piece.

8. The electrical connector as claimed in claim 1, further comprising an insulating encapsulant that fills said second accommodating space and that covers said welding section of said at least one electrode plate.

\* \* \* \* \*